INVENTOR
Willem Johannes Dominicus Van Dijck
atty.

Patented July 29, 1941

2,250,976

UNITED STATES PATENT OFFICE 2,250,976

PROCESS FOR COUNTERCURRENT CONTACT OF TWO IMMISCIBLE LIQUIDS

Willem Johannes Dominicus van Dijck, The Hague, Netherlands, assignor to Shell Development Company, San Francisco, Calif., a corporation of Delaware Application February 15, 1936, Serial No. 64,030
In Great Britain February 19, 1935

7 Claims. (Cl. 23—270.5)

The invention relates to a process and apparatus for splitting up a liquid mixture into its components or groups of components A and B by treating the mixture with a selective extracting agent S which dissolves A more readily than B, whereby the solution of extract in extracting agent obtained on extraction is washed in countercurrent with a liquid consisting wholly or substantially of A.

In the patent No. 2,081,719, issued May 25, 1937, protective rights are being claimed for a method according to which the above process is carried out in a series of two or more mixers and settlers.

Further it is described therein that also the extraction of the original liquid mixture $A+B$ with the extracting agent S, likewise in countercurrent, may be carried out in a series of mixers and settlers.

Moreover, in said patent attention is drawn to the fact that the washing process can be carried out under elevated pressure.

The present invention relates to certain improvements in the process according to which the temperature is different between different stages; in which mixers and settlers may be employed for the counterflowing of the initial mixture and the solvent and washing liquid; and in which the temperature is controlled in a novel manner. The invention is illustrated in the drawings, in which:

As regards the temperature at which the process described in the present invention is carried out, it may be stated generally that the temperature at which the extraction is carried out need not be the same as that at which the washing is done; it may be higher or lower.

It has been found, however, that the results may be improved by carefully selecting the temperature in each combination of one mixer and one settler, or in a mixer or a settler separately, and adapting it to the special conditions in that stage of the system.

The process according to the invention therefore consists in the washing of a solution of extract in extracting agent obtained on extraction being carried out in a series of two or more mixers in such a way that at least one mixer or settler is kept at a temperature differing from that prevailing in the other or the others.

In the process according to the present invention use may be made of two or more mixers consisting of a housing with feed lines and rundown lines for one of the fluids, a rotatable and drivable hollow shaft to which the fluid to be dispersed into drops is conducted, in which shaft are mounted hollow members which are in communication with the bore of the shaft and which are provided with ejection openings, for example in the side directed away from the direction of movement.

Figures 4A, 4B, 4C:
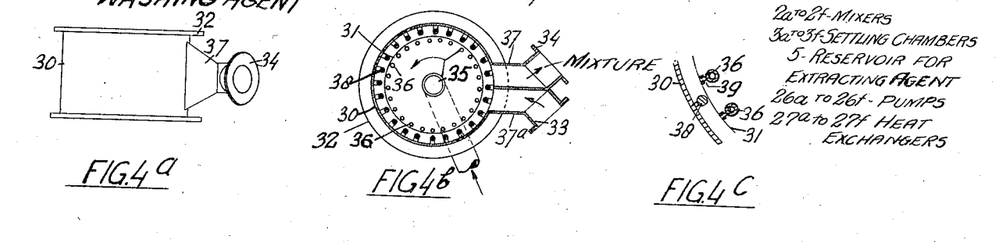
Figure 4a is a plan view of one of the mixing devices employed according to Figure 3.
Figures 4b and 4c are medial vertical sectional views corresponding to Figure 4a on an enlarged scale, showing details of the mixing device.

A mixer to which the above-mentioned description applies is also illustrated in the sectional Figures 4a to 4c of the accompanying drawings. It is also described in French Patent No. 790,206.

In the process according to the present invention a settler may also be used (vide Figs. 1 and 2) consisting of a horizontal cylinder-shaped body covered by two front plates, one of which contains an inlet opening, a perforated vertical plate near the plate containing the opening dividing the separator body into two unequal parts, a nest of parallel horizontal tubes one end of which is fixed into the perforations of said plate, impingement means at the other end of said tubes and outlet openings in the cylinder at the highest and lowest points of the cylinder.

In the present specification a process is further described in which a diluent is used at least in the washing process, it being remarked that the diluent can be removed wholly or partly from the washing system in stages.

When the liquids are caused to flow in countercurrent to each other there will always be two liquid phases of different composition in contact with each other in each mixer or in each settler throughout the whole of the washing and extracting apparatus. In general two liquid phases in one given mixer will be completely miscible (i. e. form one phase) at a temperature which differs from that at which two liquids in another mixer of the washing or extracting system will be completely miscible. It having been found that in all cases washing or extraction is best carried out at temperatures lying a certain number of degrees, say 30° C., below the temperature at which complete miscibility between two phases occurs, it is obviously recommendable to control the temperature carefully in each mixer or settler. It is to be observed that the temperature in a certain mixer need not be equal to that in the corresponding settler. Strictly speaking it is the temperature of the settler that is decisive for the practicability of the process.

It is evident that when passing from one end of the washing and/or extraction system to the other temperatures of different values may be encountered. The highest temperature may be at the end of the washing system, that is to say where the washing liquid has fulfilled its purpose in the washing apparatus, but it may also be at the beginning or in the middle. If there is a rise in temperature when proceeding from the beginning to the end of the washing apparatus, this rise may continue in an extraction apparatus coupled to the washing apparatus, so that at the beginning of the extraction apparatus, that is where the fresh solvent enters, there will prevail the highest temperature of the whole of the combined system. However, the reverse is also possible, the temperature being highest in the middle of the combined apparatus.

Figure 5:
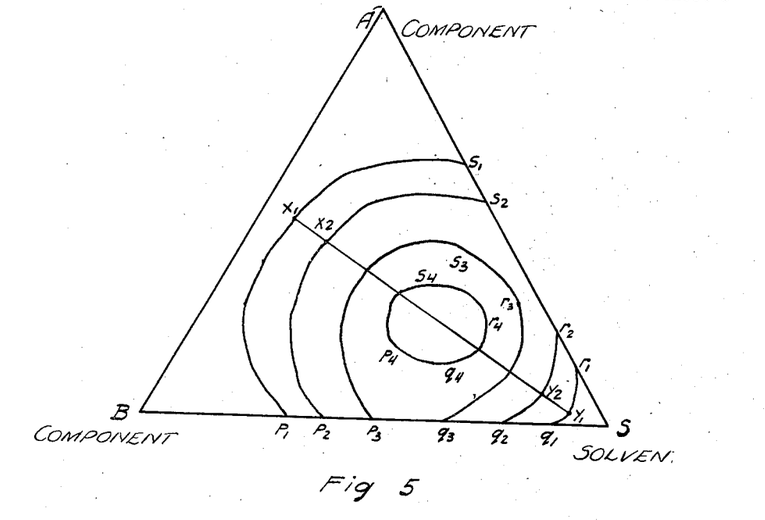
Figures 5 and 6 are ternary diagrams illustrating miscibilities of phases which may occur in the extraction process.

In Fig. 5 one of the ternary systems is illustrated in which it would be advantageous to apply the highest temperature in the middle of the combined extraction and washing apparatus. The application of the highest temperature in the middle of the system, i. e. at the place where the feed is introduced is, however, not limited only to systems of the kind illustrated in Fig. 5, since in the case of the binodal curve having other shapes the process can also be used to advantage.

In the said figure several binodal curves denoting the area of limited miscibility of the phases have been drawn, each binodal curve or each of the pair of lines of which a binodal curve may be considered to consist applying to one temperature.

The binodal curve for the temperature $t_4$ is represented by the line $p_4\ q_4\ r_4\ s_4$, which means that liquid mixtures of a composition designated by a point lying within the area enclosed by the binodal curve split up into two layers (phases) of different composition, these compositions being designated by two points lying on the binodal curve. At the temperature $t_3$ the binodal curve has the shape indicated by the line $p_3\ q_3\ r_3\ s_3$. At the temperatures $t_2$ and $t_1$ the binodal curves have the shape $p_2\ q_2\ r_2\ s_2$ and $p_1\ q_1\ r_1\ s_1$. In the foregoing it is assumed that $t_4 > t_3 > t_2 > t_1$. From the shape of the binodal curves it can be seen that the miscibility of the phases represented by the points $x_1$ and $y_1$ is only small, if their compositions are compared with those of the points $p_1$, $q_1$ or $r_1$, $s_1$.

A ternary system in which the conditions described above approximately occur consists of acetone (A), phenol (B) and water (S). If the extraction of the initial mixture (A+B) is carried through so far that in the extraction apparatus pure B is made, this means that in the first stage of the extraction pure B is contacted with pure S, as a result of which the phases $p_1$ and $q_1$ are formed.

If in the first stage of the washing apparatus pure A is used as washing agent, this means that at this point the other phase present, which is rich in solvent S, can only contain the component A. The composition of the two phases at the temperature $t_1$ is, therefore, designated by $r_1$ and $s_1$, these being the only mixtures of A and S which can co-exist as separate phases.

Now applying the rule that two phases are all the more miscible as the points by which their composition is denoted are nearer to each other, it is apparent that the miscibility of the phases $x_1$ and $y_1$ is poor as compared with that of $p_1$ and $q_1$ or $r_1$ and $s_1$.

It being the object of the present invention to control the miscibility and consequently the exchange of components between two co-existent phases by means of the adjustment of the temperature, the temperature in the middle of the combined extraction and washing system, where phases occur the compositions of which are designated by $x_1$ and $y_1$, must be increased, e. g., from $t_1$ to $t_2$ in order to increase the miscibility of $x_1$ and $y_1$ to miscibilities denoted, for example, by the points $x_2$, $y_2$. From the foregoing it will be evident that, as the miscibility of the phases at the ends of the system is sufficient, the temperatures there may be relatively low.

In the above-mentioned example it is assumed that the miscibility of two co-existent phases increases as the temperature increases. However, the reverse may also occur, i. e. the miscibility may decrease as the temperature increases. Of the latter phenomenon, which is not so commonly observed as the former, an example may be found in those ternary systems where propane, lubricating oil and phenol are the components, the propane occurring under nearly critical conditions.

Figure 6:
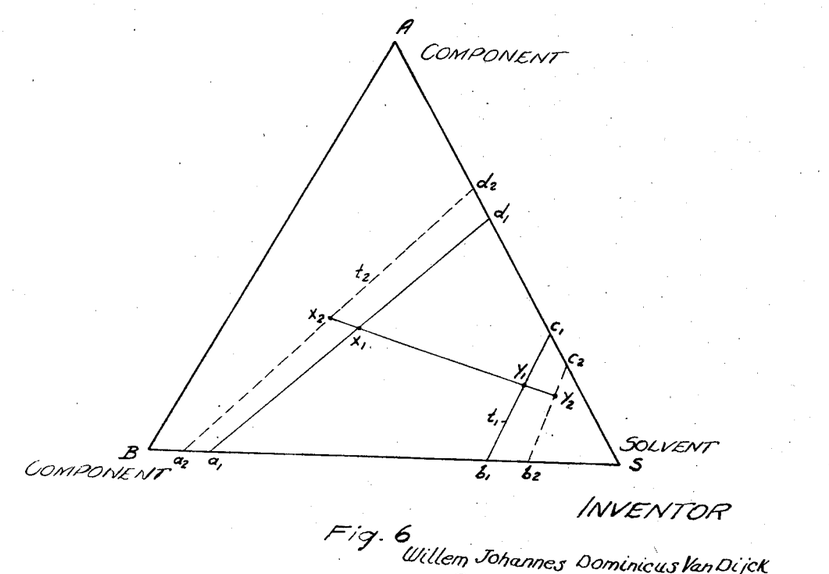

Considering for one moment only the washing section and assuming the miscibility of the component A with S at the temperature or the range of temperatures at which the extraction of the mixture A+B with S was carried out to be excessive, either a stepwise cooling or a stepwise heating of the washing section must be effected. These two possibilities are illustrated in the ternary system of Fig. 6, in which A is more miscible with S than B. The miscibility of the components A and S, being excessive, should be decreased in those cases where phases rich in A and S are being contacted; this may be effected:

1. By decreasing the temperature if the miscibility decreases as the temperature decreases;
2. By increasing the temperature if the miscibility decreases as the temperature increases.

In the first case the temperature at the inlet of the washing agent should be the lowest temperature of the whole washing or washing + extraction system; it should steadily increase in the direction of flow of the washing agent, i. e. in the direction in which the A-content of the phases decreases.

In the second case the temperature at the inlet of the washing agent A in the washing system should be the highest of the whole system and should decrease stepwise in the direction of flow of the washing agent.

In Fig. 6 two pairs of binodal curves have been drawn.

At the temperature $t_1$ A and S are miscible to an extent designated by the point $c_1$ and $d_1$. These points lying close together, a high miscibility at the said temperature is illustrated thereby. B and S are miscible to an extent designated by the points $d_1$ and $b_1$.

At the temperature $t_2$ the phases $c_2$ and $d_2$ are in equilibrium with each other, the situation of these points indicating that the miscibility of the said phases is smaller than that of the phases $c_1$ and $d_1$.

It is obvious that, according to the previous assumptions regarding the change in miscibility with the temperature in the case sub 1, $t_2$ must be lower than $t_1$, whereas in the case sub 2 $t_2$ must be higher than $t_1$ (compare Fig. 6).

The phases $x_1$ and $y_1$ or $x_2$ and $y_2$ are phases containing A, B and S; they occur towards the end of the washing system. The points lying further from each other than the phases $c_1$ and $d_1$ or $c_2$ and $d_2$ on corresponding binodes, it is obvious that at these points ($x$ and $y$) use has to be made of the phase-composition controlling effect of the temperature to a less extent than at the beginning of the system. If, therefore, the miscibility at the beginning of the washing system has been controlled by keeping the temperature at a low level ($t_2$) (the case discussed sub 1 above), the temperature at the point of the washing system where the $x$ or $y$ phases occur need not be so low as $t_2$, but it may be a temperature lying between $t_1$ and $t_2$, or a temperature $t_1$, or a temperature higher than $t_1$.

From the above it will be clear that nothing can be said in general regarding the stepwise change of the temperature. In the first place this depends on the miscibility relations of the liquids coming into contact with each other in each mixer or settler. With the process according to the invention it is evident that one cannot speak of a gradual change in temperature, but that the temperature changes step by step from mixer to mixer.

Obviously it is not always necessary to work in each mixer at 30° C. below the critical point of miscibility of the phases, any other temperature differential yielding good results.

The temperature for each mixer or settler should in the first place be so chosen that the two phases therein do not completely mix or excessively mix and dissolve each other, a state of affairs which might arise if, for instance, in the next mixer two liquids which are more readily miscible are brought together at the same temperature as that at which two other less miscible liquids were brought together in the first mixer.

Further, the temperatures in the various mixers or settlers can be so chosen that, for example, the quantity of the washing liquid in the washing system remains constant from mixer to mixer (or from settler to settler). Moreover the temperatures in the mixers and/or settlers can be controlled in such a way that the concentration of dissolved components in the solvent is kept constant or practically constant. Generally speaking, by controlling the temperature it can be ensured that in a part of or throughout the washing or the extraction system the quantity of each of the two phases passing from mixer to mixer is kept constant.

When a washing and extraction system coupled together is used for extracting the liquid mixture it is to be borne in mind that at the point of entrance of the feed (i. e. for instance approximately in the middle of the coupled system) there will be a sudden change in the quantities of the two phases. As a rule, upon liquids being introduced and/or withdrawn at one or more intermediate points of an extraction and/or washing system there will be a sudden change in the quantities of the two phases.

The method of withdrawing liquids is generally referred to as "taking off side-streams." It is usually done to obtain products of intermediate composition. Although, therefore, in the whole of the washing system the quantity of washing liquid may have been kept constant, when passing a point of introduction or/and withdrawal of liquids there will be a change in the quantity. Of course, with a proper selection of the temperature it is possible to keep that new quantity constant again in that part of the extraction system through which it travels.

The extent and direction of the temperature changes taking place from mixer to mixer or from settler to settler, are, however, determined by variations in the mutual solubility of the phases at different temperatures.

If, for instance, it is found that the quantity of extract phase flowing through the washing system at uniform temperature increases, then if it is desired to keep that stream constant the temperature will have to be decreased in the direction of flow of the washing liquid at those parts of its course where the mutual solubility of the phases decreases with decreasing temperature.

However, also other temperature adjustments are possible. In the case just mentioned the temperature can be raised in such a way that the quantity of one of the flowing phases is not only not increasing but even diminishing.

According to the invention it is possible to regulate the temperature of each stage, i. e. of a settler and/or mixer, in such a way that the total, i. e. the washing and/or extraction system, yields optimum results, which obviously is not the same as to regulate the temperature in such a manner that an optimum effect is obtained in each stage.

In order to control the temperatures in the various mixers or settlers it is necessary to keep a close watch over the working conditions, as often it is desired to control the temperatures according to a number of variable factors. For instance it is sometimes recommendable to adjust the temperature in a certain stage of the extraction system and/or washing system in relation to the quantity ($V$) of one of the phases leaving a phase separator (settler) by watching either the intensity of the flow ($V/t$) or the variation of the flow per unit of time ($t$) $=dV/dt$, or both, preferably of the phase occurring in the least quantity, and acting accordingly. However, the temperature in a certain stage of the extraction and/or washing system can be adjusted in relation to the level ($h$) of the plane of separation between the two phases in the settler and/or in relation to changes taking place in that level per unit of time ($dh/dt$).

The question whether the temperature is to be carefully controlled in the mixers and/or in the settlers depends on the technical working conditions.

Various cases may occur. If, for instance, the heating or cooling devices required in the process are situated between the mixer and the settler then the temperature in the settler can easily be controlled, whilst that in the mixer can be more or less left to itself. If, however, the aforesaid devices are in front of the mixer the two liquids already brought to temperature will meet each other in the mixer, and in that case both the temperature of the mixer and that of the settler will be controlled simultaneously. With the latter embodiment cooling or heating devices as a rule need not be built in both the lines leading to the mixer, it being sufficient to obtain the proper temperature of the mixed liquids.

This careful control of the temperature is accompanied by great advantages, one of which is, for instance, that with a smaller number of mixers and settlers the same final products can be obtained as are produced with a larger number kept at uniform temperature, with the result that the washing and/or the extraction is more intensive.

It could not be foreseen that mixers and settlers could be used advantageously with the process described.

The introduction of mixers and settlers instead of continuous columns has on the one hand the advantage of an improved contacting, but on the other hand the disadvantage of not allowing the temperature to be changed gradually. Consequently it could not be foreseen that the process of working with step-like changes in temperature in countercurrent in mixers and settlers would yield such satisfactory results as have thereby been obtained in practice.

It may occur that at the washing temperature the component or group of components A has so great a viscosity as to preclude the obtaining of the maximum efficiency even when washing in mixers. It is then recommendable to add to the mixture to be split up or to the washing liquid a viscosity-reducing agent in order to increase the fluidity of one or more of the components of the mixture. However, with mixers and settlers the use of a viscosity reducer is required only under more adverse conditions than with a column.

In consequence of the addition of the viscosity reducing agent the concentration deficit will decrease. On the other hand the viscosity reduction increases the transport of material, which is even a greater advantage than the decrease of the concentration deficit. It is, of course, possible to add the viscosity-reducing agent in such a quantity as to bring about a considerable decrease—even down to zero—of the concentration deficit. Considering, however, that the concentration deficit is the driving force for the extraction, i. e. the passing of a certain component into the other phase, it goes without saying that this deficit cannot be decreased ad libitum, even though the viscosity should continue to be reduced on more and more of the above-mentioned agent being added.

The said agent should preferably be so chosen that the miscibility relations between the components A and B on the one hand and the extracting agent on the other hand are not adversely affected. For example, the diluent intended to be used as a viscosity-reducing agent for a certain component or group of components may have the additional effect of increasing the miscibility of the non-viscous component or group of compenents B with the extracting agent, as a result of which the solution of extract in extracting agent obtained on extraction contains more of the component B than would be the case if no diluent were used. Consequently higher demands are made upon the washing process following the extraction. This objection may be overcome by wholly or partially removing the diluent added to the washing liquid after the washing and prior to the extraction of A+B with O, e. g. by distilling or freezing out, for example in several stages of the washing system (section). When the washing in the washing section is completed, the washing liquid which, for example, consisted wholly of A, to which has been added the diluent D, has removed the component B from the solution of extract A+B in extracting agent O. The spent washing liquid would, therefore, consist of A+B+D if the diluent D had not been removed in stages during the washing. As, however, the diluent has been removed, the spent washing liquid consists of A+B, a liquid which can be treated in the extraction system with O. Other conditions may prevail which make it possible, e. g. to remove also a part of the diluent present in the extraction system.

Conditions are most favourable when the diluent behaves with regard to the extracting agent O approximately in the same way as does the component A and at the same time the solubility of B in O is reduced.

Viscous extract components (A) are formed, for example, in the extraction of more or less viscous mineral oils with e. g. liquid sulphur dioxide, furfural, nitrobenzol, Chlorex ($=\beta\beta'$-dichlorethyl ether), etc. They also occur in the splitting of organic liquids containing naphthenic or sulphonic acids, e. g. those obtained from mineral oils.

The effect of the variable temperature is in many cases similar to that of diluents. Just as the viscosity or specific gravity of a liquid mixture can be reduced by adding a diluent, so can this be effected by raising the temperature. The addition or removal of a diluent in stages is exactly similar to the application of a step-like change in temperature between successive mixers or settlers.

It goes without saying that in a certain part of the washing or of the extraction apparatus one of the measures described can be replaced by the other. Also both may be applied together, the viscosity, for instance, being reduced partly by raising the temperature and partly by adding a diluent.

In certain cases it is more advantageous to raise the temperature, as for instance when by adding a diluent the concentration deficit would be greatly reduced.

The effect that a raising of temperature has on a property of the liquid mixture need not be in the same sense as that of the addition of a diluent.

Besides removing a part or the whole quantity of the diluent it is also possible to remove a part of one of the phases at some intermediate point, of the extraction and/or washing system, in order to win products of intermediate composition. If, for example, at the beginning of the washing system, i. e. where the washing agent enters, there flows off a liquid consisting of O and pure A, it is possible to remove a part of the extract solution, still containing some B, at a point intermediate between the beginning and end of the washing system.

It is evident that the driving force for moving the two phases with regard to each other in the columns is the difference in specific gravity between the liquid phases in contact with each other. This difference in specific gravity which makes the liquids move with regard to each other has been proved often to be insufficient to ensure a rapid extraction. The difference can be increased by the addition of substances which increase or decrease the specific gravity. These substances may, if desired, be combined with viscosity-reducing agents. It is also possible to choose one substance exercising both influences simultaneously. Thus, when extracting heavy hydrocarbon oils liquid propane may be used as an agent reducing the viscosity and the specific gravity at the same time. On the other hand the chlorinated hydrocarbons, such as trichlor ethylene or chloroform, are substances raising the specific gravity and reducing the viscosity.

The specific gravity of the extracting agent used should be either higher or lower than that of the components of the mixture to be split up.

However, the necessity of an appreciable difference in specific gravity between the extracting agent and the mixture to be split up is much less imperative when using mixers and settlers.

In fact, the difference in specific gravity is then only required to bring about a separation of two layers and not to effect a movement of two phases with regard to each other. The difference in specific gravity between the phases in the first case may then be much smaller, without the extraction process in its entirety becoming impracticable.

Moreover it is possible, when separating the two liquid layers, to accentuate the possibly slight difference in specific gravity by making use of a centrifuge. According to the process of the invention it is possible to replace one or more settlers by a centrifuge at any place where the settlers to be described below fail to produce sufficient effect, the separation into two layers, for example, not being brought about rapidly enough.

When using mixers the drawback that the extracting conditions have to be chosen in such a manner as to ensure a considerable difference in gravity between the two phases is obviated for the greater part. Some difference in specific gravity is, of course, required, as otherwise the settling into two separate layers after the mixing could not take place.

Through the intensive stirring, brought about by external forces, the particles of the liquids to be contacted are brought in each other's vicinity, so that an interchange of components may take place, such quite independently of the fact whether the specific gravity of the liquid phases differs appreciably.

The position of the coolers in the system is of great importance, since the cooling down of any one phase may cause the formation of a new phase, as a rule consisting of very minute drops, which will give rise to difficulties in settling. It has been found highly recommendable to fit the temperature-adjusting apparatus (cooler or heater) behind the mixer (vide Fig. 3 where the exchangers are indicated by 27a and 27f). The space of the temperature-adjusting apparatus is then also turned to account as exchanger for the substances. In fact, after the mixing, i. e. the making of two phases, of which the disperse phase is preferably to be so made as to have only or substantially the desired size of drops, the exchange of components has not yet reached the equilibrium attainable under the circumstances. This exchange is now completed in the cooler (or heater) before the phases are separated again in the settler. Moreover with the coolers (or heaters) in the position described there is the advantage that the risk of fine emulsions being formed is diminished, the substances which are separated from one of the phases by means of the temperature change now having an opportunity of settling on the disperse phase already present. This action is analogous to that occurring in crystallisation by cooling a solution in which large crystals are already present. The formation of fine grain is thus checked to a great extent.

Concerning the position and the nature of the liquid displacement apparatuses it has been found that it is not necessary to use such an apparatus for every phase to be transported to a mixer, but that only one pump between each stage of the extraction and/or washing system will suffice if these pumps operate in such a manner that the state of the emulsion does not undergo any change while the emulsion flows through the pumps.

In the case described use should not be made of pumps with violently moving or rotating parts, such as centrifugal pumps. Pumps of the Howard or Mouvex type, indicated in Fig. 3 by the Nos. 26a to 26f, give good results.

The process according to the invention is applicable to all sorts of liquid mixtures. It is of great advantage in the extracting of liquid mixtures where the mutual solubility of the two phases between which components pass over from one to the other or are exchanged in the various mixers or settlers changes appreciably with the temperature.

The said process is of special use in the manufacture of high-quality Diesel fuels or kerosenes from hydrocarbon oils.

It is also suitable for the splitting up of mixtures containing organic polar or polarisable compounds. The mixtures may, however, also contain inorganic compounds, such as water. In the case of mixtures containing organic compounds with different numbers of polar groups, a great difference in specific gravity between the components of the mixture often occurs, if the polar groups present in a compound contribute in themselves to a great extent towards the specific gravity, as is the case with nitro- or bromium-compounds. This phenomenon may also occur with organic metal compounds.

When, for example, it is desired to separate a mixture of monobromium benzol and dibromium benzol(s) in an extraction column, it will be necessary to choose an extracting agent the specific gravity of which is lower than that of the monobromium compound or higher than that of the dibromium compound in question.

An example of a liquid mixture which may be treated according to the process of the invention is, inter alia, an aromatic-containing benzine (petrol) with a final boiling point of 110° C. As extracting agent furfural is used. As washing liquid for the furfural-extract phase a part of the extract left after the washing and freed from furfural is used.

From coal tar phenols can be extracted with the aid of alcohol, the phenol-containing extract phase being washed with phenol.

Aqueous acetic acid solutions, e. g. 5% solutions, may, for example, be treated with amyl acetate. The acetic acid-extract phase is then washed with part of the extract left after the washing. This is, in the present case, a 75% acetic acid solution.

Further examples are:
1. Glycol and glycol ethers;
2. Isopropyl alcohol, isopropyl acetate and water;
3. Ethyl acetate and ethyl alcohol;
4. A glycol-glycerine-water mixture;
5. Methyl alcohol and amyl alcohol;
6. Nitroglycerine and glycerine;
7. Sulpho-acids may be separated from petroleum oils;
   Sulpho-acids may be used as backwash, preferably mixed with another liquid, preferably soluble in the extracting agent used;
8. Glycol and glycol chlorhydrin ($CH_2ClCH_2OH$);
9. Water and chlorhydrin.

In Example 1 ether can be used as extracting agent, whereas glycol ether (A) is used in the washing process as backwash. In Example 2 benzol can be used as extracting agent; isopropyl acetate is used as component for the backwash.

In Example 3 a calcium chloride solution may be used as extracting agent. Alcohol is used as a backwash.

In Example 4 chloroform is used as extracting agent; this dissolves glycol more readily than glycerine. The extract solution, which, besides glycol, also contains some glycerine, is washed with a solution rich in glycol. In Example 5 in treating a mixture of methyl alcohol and amyl alcohol containing more methyl alcohol than amyl alcohol, the mixture is extracted at low temperature with the aid of heptane. The extract solution which contains more amyl alcohol than methyl alcohol is washed in countercurrent with a washing liquid rich in amyl alcohol, i. e. in any case a liquid in which the ratio of amyl alcohol to methyl alcohol is larger than that in the extract solution obtained in the extraction. Part of the extract solution which has already been washed and from which the heptane has been removed, i. e. part of the final product, may be used as the washing liquid.

Figures 1, 2:
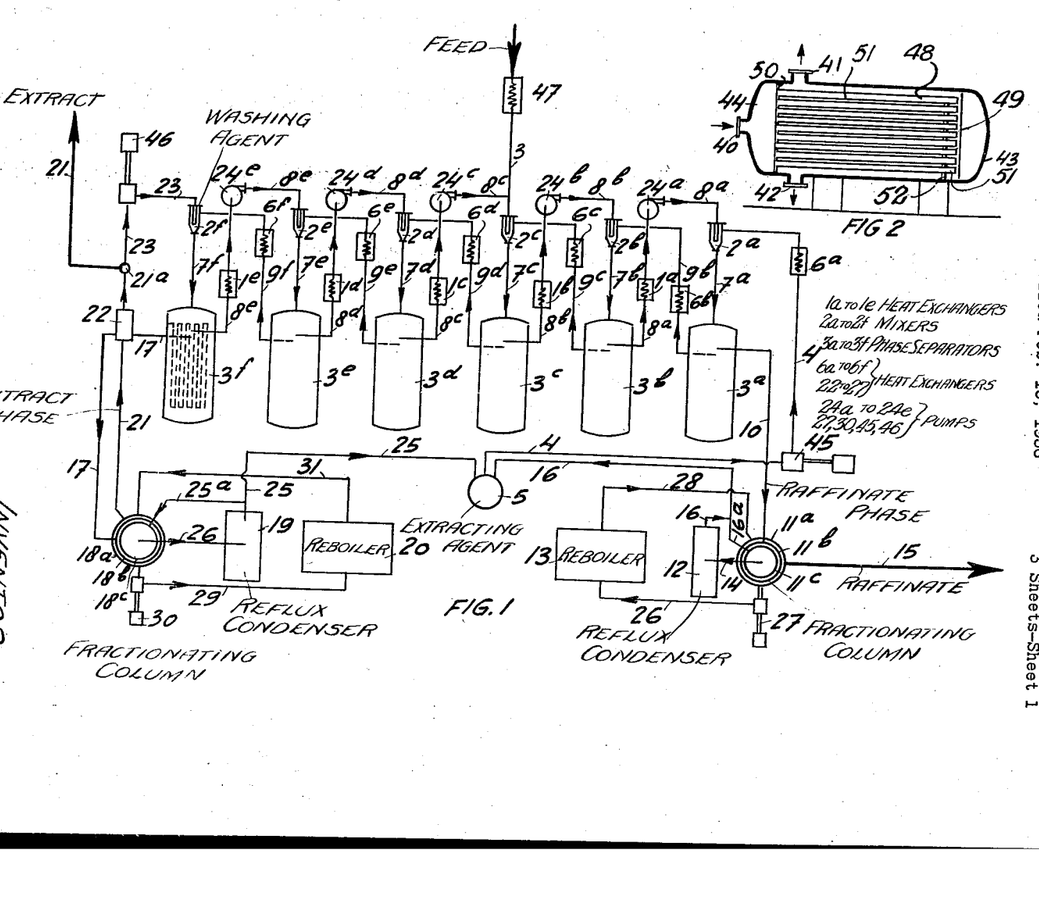
Figure 1 is a diagrammatic plan view of one embodiment of the process.
Figure 2 is a vertical sectional view, partly in elevation, of one of the settling units employed according to Figure 1.

If at the extraction and washing temperatures the miscibility relations between the alcohols (A and B) and heptane (O) are such as are shown in Figure 2 of the drawings of the Netherlands specification No. 33,941, i. e. such that A is only partially miscible with O, pure amyl alcohol can be obtained and pure amyl alcohol can be used as a washing liquid to remove any methyl alcohol present in the extract solution consisting of heptane amyl alcohol and methyl alcohol obtained after the extraction proper.

In Example 6 a mixture of nitroglycerine and glycerine with a relatively low content of glycerine is extracted with the aid of water. The glycerine is selectively dissolved so that at the end of the extraction proper there is obtained a solution of glycerine in water containing nitroglycerine. A liquid rich in glycerine is used as washing liquid to remove as far as possible the nitro-glycerine contained in the solution. The washing liquid may be produced by partly or wholly removing the water from the extract solution obtained after this has been washed.

In Example 7 ether or a higher alcohol such as amyl alcohol, may be used as the extracting agent. In Example 8 ether or a mixture of higher secondary alcohols containing 13 to 18 carbon atoms is used as extracting agent. A solution substantially consisting of glycol chlorhydrin is used as a backwash.

The miscibility relations being as shown in Fig. 1 of the Netherlands specification No. 33,941 (glycol chlorhydrin being completely miscible with the alcohols), the glycol chlorhydrin cannot be obtained 100% pure when applying the process of the invention. Both components may be obtained in a pure state by using a gasoline or a gasoline fraction containing aromatics, e. g. a mixture of 3 vol. of petroleum ether (boiling range 60-80° C.) and 2 vol. of benzene. Pure glycol chlorhydrin can then be used as backwash. In Example 9 ethylene chloride is used as extracting agent, chlorhydrin being used as backwash.

In Figs. 1 and 2 an embodiment of the process according to the invention is illustrated. In this case a type of settlers is used which is better able to withstand elevated pressures.

These settlers in which the separation of the two phases takes place have been indicated in Fig. 1 by the numerals 3a to 3f inclusive.

In Fig. 2 such a phase-separator has been drawn on an enlarged scale.

The apparatus consists of a cylindrical body 48, shut off by the curved front plates 43 and 44. In the front plate 44 is the inlet 40, provided with a flange.

In the settler is a nest of tubes 51, open at both ends. These tubes need not be all of the same length. It may be recommendable to take tubes of decreasing length. In that case the longest is put into the top layer, one slightly shorter in the next layer and so on, in such a manner as to ensure that their discharge holes are not all in the same vertical plane.

The application of such tube layers with staggered ends has the advantage that, if the separation of the two phases in the tubes is not sufficiently complete, when the two phases flow out of the tubes the lighter phase, flowing from a lower-lying tube, need not penetrate through the heavier phase flowing from the higher tube layer. The latter movement may partly undo the separation which has already taken place in the tubes, owing to the mixing occurring. The intention is that the flowing together of the small dispersed particles to larger ones shall have taken place as much as possible in the tubes. The use of tubes of gradually decreasing length is particularly advantageous if the said coalescence has not been carried out to a sufficient extent in the tubes.

On the side of the inlet pipe 40 the tubes have been fixed, e. g. rolled into a vertical plate 50. The plate 50 touches the wall of the cylindrical body 48. The liquid entering through the inlet 40 can flow on further only through the tubes 51 of the nest. In the tubes it becomes quiescent and there the separation of the phases is effected as completely as possible, i. e. larger liquid agglomerates are formed from the small drops. At some distance from the ends of the tubes is the vertical baffle plate 49. This forces the liquid phases to turn about without mingling and to flow back on the outside of the tube. In the latter space the drops which had already been united in the tubes to large conglomerates separate into an upper and a lower layer. The layers disappear through the openings 41 and 42.

If the discharge holes of the tubes are staggered stepwise, it is also possible to fit in a steplike plate, so that the distance between the end of the tube and the vertical plate remains constant; this is not necessary however. It is also possible to fit the plate 49 in a sloping position, thus keeping the distance between the end of the tube and the plate practically constant. In Fig. 1 as far as possible the same numerals are used as in Fig. 3 for corresponding apparatuses.

As mixing apparatus use is made of a combination of a series of centrifugal pumps 24a to 24e, 45 and 46, with a series of ejectors 2a to 2f. In consequence of the rapidity with which the liquid enters the core of the ejector house through one of the conduits 8a to 8e or 23, the liquid introduced through the conduit 4 or one of the conduits 9b to 9f is sucked in and mixed intensively. It goes without saying, however, that other mixing apparatuses may also be used, e. g. a turbo-mixer or a centrifugal pump specially constructed for the purpose. The rotating mixer of Figs. 4a to 4c may also be used.

The mixture to be split up is introduced through the conduit 3. It is possible to heat or cool it in the apparatus 47, which may be a heat exchanger.

Figure 3:
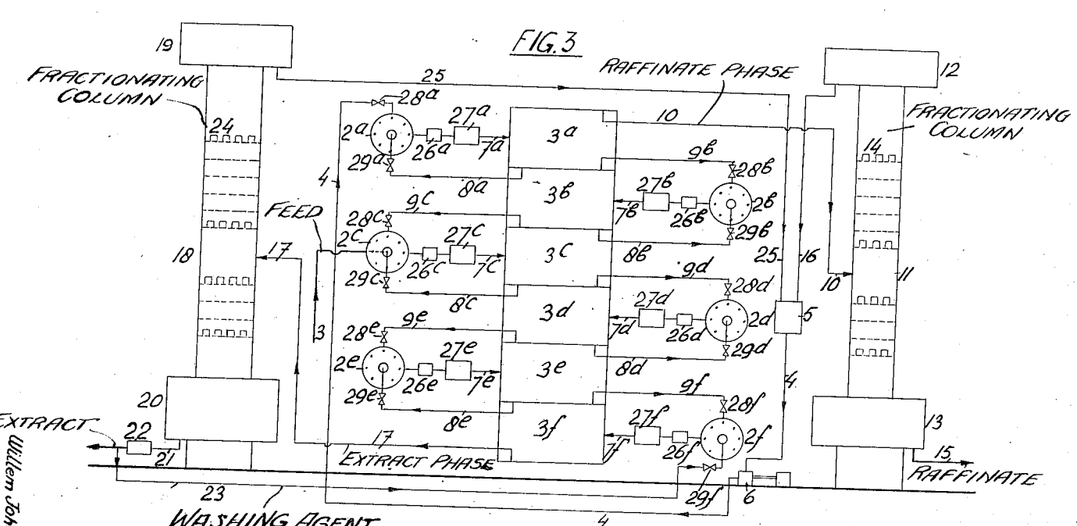
Figure 3 is a diagrammatic elevation view of a modification of the process.

In the mixers 2a to 2c inclusive and the settlers 3a to 3c inclusive the countercurrent extraction takes place with the extracting agent fed through the conduit 4. The part not dissolved during the extraction leaves the settler 3a through the conduit 10 and enters the fractionating column 11a to 11c inclusive, indicated by three concentric rings. The columns may have the form as indicated in Fig. 3 by reference number 11 or 18.

By the circle 11a is meant the top, by 11b the middle part and by 11c the bottom of the column. The reboiler is indicated by 13 and the reflux-condenser by 12. The vapour leaving the top via conduit 14, consisting of extracting agent, is condensed in 12. The condensed product flows off through the conduit 16. A part is returned as reflux into the column through the conduit 16a. The heat required for the distillation is supplied at the bottom of the column by discharging part of the bottom product by the pump 27 via the conduit 26, heating it in the heater 13 and returning it via the conduit 28.

The raffinate freed from solvent leaves the column via the conduit 15.

The solution of extract in extracting agent obtained on extraction leaves the apparatus destined for the extraction through the conduit 9d. In the mixers 2d to 2f inclusive and in the settlers 3d to 3f inclusive the washing of the extract phase takes place. As washing agent a part of the extract resulting after the washing is used. The extract solution, freed from the undesired constituents, i. e. the component or group of components B, leaves the last settler through the conduit 17, then being passed into the column indicated by 18a to 18c at the place 18b, thus half-way up, and freed from extracting agent. This extracting agent leaves the top of the column through the conduit 26, is condensed in the reflux-condenser 19 and flows through the conduit 25 to the stock-reservoir 5. Part of the condensate returns via 25a as reflux.

The extract phase freed from extracting agent leaves the column at the bottom through the conduit 21 and passes a heat-exchanger 22. A part serves as washing liquid and returns to the system via the conduit 23 and the pump 46.

The column 18 is likewise provided with a reboiler installation 20. The latter is connected to the bottom of the column by means of the conduits 29 and 31 and pump 30.

In Fig. 1 the cooling or heating apparatuses have been indicated by the numerals 1a to 1e and 6a to 6f, i. e. they have been constructed in the conduits which lead the phases to be mixed to the mixers 2a to 2f.

A similar process as in Figs. 1 and 2 is illustrated in Figs. 3 and 4a to 4c. In Fig. 3 an extraction system has been drawn, built up of 6 mixers (2a to 2f inclusive) and 6 settlers (3a to 3f inclusive). However, it is possible to use a greater or smaller number of these.

The mixing apparatus, drawn in cross-section on an enlarged scale in Figs. 4b and 4c, consists of a cylindrical casing 30, provided with two connecting branches 37 and 37a. These branches are each provided with a short cylindrical neck bearing a flange (33 and 34).

To one flange, e. g. 33, is connected the feed-pipe of one of the liquids; to the other, 34, is connected the discharge-pipe of the mixture of liquids subjected to stirring.

The cylindrical casing is shut off on both sides by covers 32, through which a hollow shaft 35 (indicated in elevation in the Figure 4b) is mounted so as to make the shaft rotatable.

Connected to this shaft, so as to form a cage-shaped body, are a number of pipes 36 running parallel thereto and connected thereto in liquid flow relation by means of circular header 31. When the hollow shaft rotates the pipes rotate too. The pipes are supplied with rows of holes 39, preferably on that part of their circumference which stands perpendicular to the direction of rotation of the pipes (cf. also Fig. 4c).

The liquid to be split up is introduced through the rotating hollow shaft and flows through the holes 39 into the second liquid filling up the casing 30. Now, in order to obtain the desired size of drops and, consequently, the required mixing of the two liquids, absolutely independently of the quantities of liquids contacted with each other per unit of time, use is made of the dispersing effect occurring when a difference in velocity is brought about between the liquid jet leaving the discharge holes and the liquid surrounding the same. This difference in velocity is obtained, for example, by imparting a movement to the pipes 36—i. e. the elements bearing the discharge holes—with regard to the liquid which is to form the continuous phase and that present in the casing of the mixer.

As the continuous phase moves only slowly in the casing of the mixer, it will be necessary, in order to obtain a thorough mixture of the liquids, to have the pipes to be rotated move with a speed greater than and entirely or partly in an opposite sense to the rate of discharge of the liquid to be distributed from the openings of the pipes. The size of the drops of the disperse phase has thus become practically independent of the quantity of said disperse phase brought into contact per unit of time with a given quantity of continuous phase and is then determined almost exclusively by the velocity of the pipes.

The continuous phase will not be altogether motionless but will try to rotate together with the cage built up of the rods 36. As a check (brake) a number of rods 38 have been fitted at mutual distances preferably unequal to those between the cage pipes, it thus being rendered impossible that all the pipes should at any moment be simultaneously opposite to check rods.

The average rate of flow of the continuous phase through the casing of the mixer is relatively small as compared with the rate of discharge of the primary liquid and the circumferential speed of the pipes.

As an example of the velocities applicable in the mixer a rate of discharge of about 0.2 m./sec. may be mentioned for the liquid to be dispersed and a circumferential speed of 2.5 m./sec. for the spraying tubes, the difference in velocity between these two thus being about 2.3 m./sec.

For further embodiments of the mixer described and for variations in so far as the mixing process itself is concerned reference may be had to the French patent specification No. 790,206. All the variations, however, relate to a process for distributing a given liquid drop by drop into another by causing the former to flow continuously into the latter through openings provided for this purpose.

In general, however, the process is characterized by the creating of a relative motion between the second liquid and the member containing the discharge openings, the relative motion of the former with regard to the latter being preferably wholly or partially in the direction of outflow of the primary liquid, the velocity of such motion to be chosen so as to exceed the velocity of discharge of the primary liquid in the discharge holes, and to be controlled according to the desired size of drops, independent of the quantities of liquid brought into contact with each other per unit of time.

In Figure 3 the mixture to be split up, e. g. a mineral lubricating oil, is conducted through conduit 3 (in Figs. 4b and 4c through the hollow shaft 35 and openings 39) into the mixer 2c whilst the extracting agent is conducted from tank 5 via conduit 4 and pump 6 to the mixer 2a. It has therefore been assumed that the extracting agent has a higher specific gravity than the components of the mixture. The mixture to be split up can also be fed through conduit 8c. In the latter case the construction of the inlets is somewhat simpler.

In the system of mixers and settlers situated between the above-mentioned places, viz. between the mixers 2c and 2a, a countercurrent extraction takes place between the mixture to be split up and the extracting agent.

In the mixer 2a the fresh extracting agent is mixed with the oil which has separated as a top layer in the settler 3b from the mixture of liquids which has left the mixer 2b through conduit 7b. The said oil has been withdrawn from the settler 3b through the conduit 8a and is finely divided in the form of drops in the extracting agent via the hollow shaft of the mixer and the spraying tubes (36 in Fig. 4c). It is not necessary to distribute the oil in the extracting agent in fine drops, the reverse also being possible and often even desirable. In general it is the liquid with the smallest tendency to agglomerate to large masses which will be divided into fine drops.

After mixing and interchange of components have taken place between the two liquids in the mixer the mixture is led into the settler 3a via the conduit 7a, passing the pump 26a and the heat-exchanger 27a.

The settlers are vessels of a relatively small height compared with their length and breadth, the dimensions in Figure 3 not giving the true relation.

In settler 3a the bottom layer, laden with extract components and rich in extracting agent, separates from the top layer from which the extracting agent has withdrawn the most readily soluble constituents. The top layer, which contains a small quantity of extracting agent, is led via conduit 10 to a rectifying column 11. The latter is provided with the known perforated plates 14 with bubble caps. The extracting agent has been assumed to have a lower boiling point than the oil; of course the reverse is also possible.

The extracting agent leaves the column 11 via the conduit 16, after part of the vapours rising from the column has been condensed in the reflux-condenser 12 on top of the column, for the formation of the required reflux. After complete condensation and cooling the regenerated quantity of solvent is led back into the collecting vessel 5. The solution of extract in extracting agent obtained on extraction leaves the settler 3c via the conduit 9d and is mixed with the washing liquid in the mixer 2d. The actual washing process is effected in countercurrent in the mixers 2d to 2f inclusive and in the settlers 3d to 3f inclusive. The washing liquid is led via the conduit 23 and valve 29f into the hollow shaft of the mixer 2f and mixed with the bottom layer rich in extracting agent which flows off from the settler 3e via the conduit 9f. After mixing, the separation of the two phases takes place in the vessel 3f.

The washed extract solution flows off via the conduit 17. Owing to the washing in the mixers 2d to 2f inclusive all the less soluble constituents B of the mixture A+B have been removed therefrom as far as possible. In the fractionating column 18 the separation then takes place of the extract solution which consists only of A and S. The fractionating column is provided with sieve plates and the known bubble caps 24, whilst in the reboiler 20 the heat required for the distillation may be supplied in any known manner. On top of the column there is a reflux-condenser 19. The solvent separated from the extract A flows via conduit 25 into the collecting vessel 5.

The component or group of components A freed from extracting agent S flows off via the conduit 21 and the cooler 22. A part is used as washing agent and returns to the process via the conduit 23.

Although in the apparatus drawn in Fig. 3 use has been made of the mixing rotor further illustrated in Figs. 4a, 4b and 4c, it is to be remarked that other mixing apparatuses may also be used, such as centrifugal pumps, ejectors and vessels provided with a stirring device, consisting, for instance, of one or more propellers or impellers.

As cooling or heating means several fluids may be used. Thus the phases may be heated or cooled indirectly by flue gases or by hotter or colder liquids present in the extraction or washing system itself. The ultimate extract phase is particularly useful in this respect.

The washing process in the present application is regarded as being carried out in a washing system or washing section, which is formed by that part of the series of mixers and settlers which is situated between the points of entrance of the mixture to be split up (A+B) and of the liquid which consists entirely or substantially of A.

If also the extraction is carried out in a series of mixers and settlers, the extraction system or section is formed by that part of the series of mixers and settlers which is situated between the points of entrance of the mixture to be split up (A+B) and of the extracting agent (S).

The extraction process may be carried out with mixtures of solvents. The mixture to be split up may contain or consist of solid substances, i. e. either the component A and/or the component B may contain or consist of solids. If the whole mixture is solid, it must be transformed into a liquid system before it can be extracted with S. This may be done by temperature regulation until it melts or by addition of a solvent for A+B. If a liquid substantially consisting of A is used as washing agent, the other components present in said washing liquid may be either B or a foreign compound. The use of a foreign compound may be necessary if the component A (which is the true washing liquor) should contain or consist of a substance which is solid at one of the temperatures prevailing in the various stages of the washing system.

In order to be able to act as a washing agent the component A must be in a liquid condition. According to the invention this may be attained by using a carrier liquid for A and/or by controlling the temperature in the various stages of the washing system.

As the process according to the invention may be carried out at temperatures at which one of the components or the extracting agent or the diluent would give rise to vapours, which would handicap the smooth running of the process, the latter may be carried out at elevated pressures so as to avoid the formation of vapour.

The process of the invention can be carried out continuously. It may also be carried out discontinuously or semi-continuously under application of the countercurrent principle. This principle is always applied in so far as the two phases to be contacted, e. g. the selective solvent and the mixture to be split up, are introduced at opposite ends of the extraction or washing system and after acting on each other are discharged at opposite ends of the system. This does not imply that the liquids move in countercurrent to each other in every part of the path on which the two phases are in contact with each other.

I claim:

1. A process for extracting a mixture comprising components A and B into its components by means of a selective solvent for the component A, comprising the steps of introducing the said mixture at an intermediate point of a countercurrent liquid contact zone, introducing the selective solvent near one end of said zone, introducing a washing liquor near the other end of the zone, said washing liquor containing the component A in a higher concentration than the ultimate extract phase, subsequently described, and being capable of forming two liquid phases when mixed with the said ultimate extract phase, counterflowing said selective solvent and washing liquor in said contact zone in contact with said mixture, thereby producing counterflowing liquid extract and raffinate phases, separately withdrawing the ultimate raffinate phase near said first end and the ultimate extract near said other end, and maintaining at an intermediate point of the contact zone a temperature which promotes a higher miscibility of the extracting phases than the temperatures at the said ends of the contact zone while preventing total miscibility at said intermediate point.

2. The process according to claim 1 in which the difference between the temperature at the point of introduction of the said mixture into the contact zone and the said other end is such as to produce raffinate and extract phases at said other end which have substantially the same degree of miscibility as the raffinate and extract near the point of introduction of the said mixture.

3. The process according to claim 1 in which the miscibility characteristics of the liquid phases in the extraction zone are such that miscibility is increased by an increase in temperature, and the temperature at the intermediate point of the extraction zone near which the initial mixture is introduced is higher than the temperature at the ends of the extraction zone.

4. The process according to claim 1 in which the extraction is effected by flowing the washing liquor and the selective solvent countercurrently through a series of interconnected mixing and phase separating zones, and the temperature is regulated by controlling the temperature of the extraction mixtures at points intermediate the interconnected mixing and separating zones.

5. A process for extracting a mixture comprising components A and B into its components by means of a selective solvent S for the component A, comprising the steps of contacting the said mixture and solvent in a countercurrent extraction zone by introducing the solvent S near a first end of said zone and said mixture near the second end of said zone, thereby forming first liquid raffinate and extract phases, withdrawing the first raffinate phase near said first end and the first extract phase near said second end, maintaining a higher temperature at said second end of said zone than at said first end said higher temperature being insufficient to cause total miscibility of the extracting phases at said second end, flowing the withdrawn first extract phase through a series of interconnected pairs of mixing and liquid phase separating zones countercurrently to and in contact with a washing liquor which contains the component A in a higher concentration than the said ultimate extract phase and which is capable, under the conditions of the process, of causing the formation of two liquid phases of different specific gravities when mixed with the ultimate extract phase, and maintaining a higher temperature in the separating zone nearest the point of introduction of the first extract phase than in the separating zone nearest the point of introduction of the washing liquor said higher temperature being insufficient to cause complete miscibility of the extracting phases in said separating zone.

6. The process according to claim 5 in which the temperature in said separating zones is regulated by flowing the mixture produced in the mixing zones through a heat exchange zone prior to its introduction into its corresponding separating zone.

7. In a process of concentrating each of two liquid miscible components A and B from their solution by continuous extraction with a liquid solvent having a preferential solubility for component A and which is partially miscible with said solution the degree of miscibility increasing with a rise in temperature, which comprises introducing said solvent into a first zone of a countercurrent extraction system, introducing a back wash into a second zone of the system and introducing said solution at a third zone of the system intermediate said first and second zones, countercurrently treating the solution with the solvent between their points of introduction into the system, thereby producing liquid primary raffinate and extract phases, withdrawing the raffinate phase from contact with the solvent in said first zone, treating the primary extract phase and said back wash between the points of introduction of said solution and said back wash so as to form two countercurrently flowing phases, thereby producing near said third zone a liquid second raffinate phase, and at said second zone a liquid ultimate extract phase, the latter containing an extract richer in the component A than the extract of said primary extract phase, withdrawing the ultimate extract phase from the system at said second zone, the said back wash being a liquid containing component A in a concentration which is higher than the concentration of component A in said ultimate extract phase, the improvement comprising maintaining at a zone of the countercurrent extraction system at which the miscibility of the phases is normally the least and which is intermediate said first and second zones a temperature which is higher than the temperature at said first zone and is higher than the temperature at said second zone.

WILLEM JOHANNES
DOMINICUS van DIJCK.